US011631116B1

(12) United States Patent
Core

(10) Patent No.: US 11,631,116 B1
(45) Date of Patent: Apr. 18, 2023

(54) SHOPPING METHOD

(71) Applicant: Gatekeeper Financial, LLC, Findlay, OH (US)

(72) Inventor: Charles G. Core, Findlay, OH (US)

(73) Assignee: GATEKEEPER FINANCIAL LLC, Findlay, OH (US)

( * ) Notice: Subject to any disclaimer, the term of this patent is extended or adjusted under 35 U.S.C. 154(b) by 0 days.

(21) Appl. No.: 17/550,755

(22) Filed: Dec. 14, 2021

Related U.S. Application Data

(60) Provisional application No. 63/146,463, filed on Feb. 5, 2021.

(51) Int. Cl.
| | |
|---|---|
| *G06Q 30/06* | (2012.01) |
| *G06Q 10/08* | (2012.01) |
| *G06Q 20/32* | (2012.01) |
| *G06Q 30/0601* | (2023.01) |
| *G09F 9/30* | (2006.01) |
| *G06Q 10/083* | (2023.01) |

(52) U.S. Cl.
CPC ....... *G06Q 30/0603* (2013.01); *G06Q 10/083* (2013.01); *G06Q 20/3276* (2013.01); *G06Q 30/0601* (2013.01); *G06Q 30/0621* (2013.01); *G06Q 30/0635* (2013.01); *G09F 9/30* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 7,418,409 B1* | 8/2008 | Goel | G06Q 10/02 |
| | | | 705/26.61 |
| 7,590,567 B2 | 9/2009 | Hopson et al. | |
| 7,658,327 B2 | 2/2010 | Tuchman et al. | |
| 8,401,915 B1 | 3/2013 | Kim | |
| 9,043,226 B1 | 5/2015 | Foulser et al. | |
| 9,202,229 B2 | 12/2015 | Junger | |
| 9,336,508 B2* | 5/2016 | Soon-Shiong | G06F 3/0484 |
| 10,332,176 B2 | 6/2019 | Gadre et al. | |
| 10,475,072 B2* | 11/2019 | Lampert | G06Q 30/0255 |
| 10,610,031 B1* | 4/2020 | Edwards | E04F 15/105 |
| 2001/0032134 A1* | 10/2001 | Hardesty | G06Q 30/0601 |
| | | | 705/14.18 |
| 2004/0199435 A1* | 10/2004 | Abrams | G06Q 30/06 |
| | | | 705/27.2 |
| 2006/0149640 A1* | 7/2006 | Gordon | G06Q 30/0605 |
| | | | 705/26.81 |
| 2009/0037516 A1* | 2/2009 | Mihara | G06T 11/60 |
| | | | 709/202 |

(Continued)

OTHER PUBLICATIONS

Walther, L., "Now 10,000 Products at Fingertips of Hearing and Speech Impaired," PR Newswire, May 11, 1992. (Year: 1992).*

(Continued)

*Primary Examiner* — Nicholas D Rosen
(74) *Attorney, Agent, or Firm* — John Rizvi; John Rizv P.A. The Patent Professor

(57) ABSTRACT

A shopping method, comprising, at a real-world browsing environment, facilitating interaction between a shopper and a brand experience, and tracking the receipt of one or more orders to automatically execute delivery of one or more orders.

20 Claims, 7 Drawing Sheets

(56) References Cited

U.S. PATENT DOCUMENTS

| | | | | |
|---|---|---|---|---|
| 2012/0259726 | A1* | 10/2012 | Andreasson | G06Q 30/0621 705/26.5 |
| 2013/0282533 | A1 | 10/2013 | Foran-Owens et al. | |
| 2014/0129393 | A1* | 5/2014 | Soon-Shiong | G06Q 30/0643 705/27.2 |
| 2014/0143055 | A1 | 5/2014 | Johnson | |
| 2014/0297420 | A1 | 10/2014 | Patel | |
| 2015/0302474 | A1* | 10/2015 | Lampert | G06Q 30/0601 705/14.53 |
| 2016/0140639 | A1 | 5/2016 | Ainsworth, III et al. | |
| 2018/0247287 | A1* | 8/2018 | Narasimhan | G06Q 20/3276 |
| 2020/0100604 | A1* | 4/2020 | Edwards | A47F 7/02 |
| 2021/0034907 | A1* | 2/2021 | Dugar | B64C 39/02 |

OTHER PUBLICATIONS

Baker, R., "John Lewis and Waitrose trial virtual shop window," Marketing Week (Online), Centaur Media USA (Nov. 25, 2011). (Year: 2011).*

Kirst, S., "Here's a way to improve downtown's destiny," The Post-Standard (Syracuse, N.Y.), Mar. 11, 2014: A2. (Year: 2014).*

Anon., "With a Shoe Store, Paytm Mall Now Has a Foot in Both Camps," India Business Insight (Bangalore) Feb. 15, 2018. (Year: 2018).*

Sheehan, J., "By next summer, downtown Allentown could see a second food hall," TCA Regional News [Chicago] Nov. 15, 2019. (Year: 2019).*

Walker, D.I., "The blossoming of a dream," The Greenville News [Greenville, S.C.] Jul. 16, 2014: 1. (Year: 2014).*

Anon., "Mirakl Amplifies Digital Retail Space with New Department Store and Mall Marketplace Solution," Business Wire [New York] Feb. 22, 2016. (Year: 2016).*

Anon., "Mirakl Amplifies Digital Retail Space with New Department Store and Mall Marketplace Solution," Professional Services Close-Up [Jacksonville] Feb. 26, 2016. (Year: 2016).*

"Neighborhood Goods" at https://neighborhoodgoods.com/.

* cited by examiner

SHOPPING METHOD

CROSS REFERENCE TO RELATED APPLICATION

This application claims the benefit of U.S. Provisional Application 63/146,463, filed Feb. 5, 2021, which is incorporated by reference herein in its entirety.

FIELD OF THE INVENTION

The present invention relates generally to shopping methods and more particularly, to an improved shopping method.

BACKGROUND OF THE INVENTION

Shopping is an important part of everyday life as many individuals buy and sell items at stores using currency. Shopping could be defined as the act of exchanging money and goods or services, but it could also be defined as a past time or activity.

Shopping has evolved significantly over the years moving from bartering and the widespread use of precious metals to digital credit card transactions for online goods and services.

Although it is common for customers to shop online it is believed that online shoppers still have a need for brick-and-mortar type experiences because online shopping lacks social and sensory elements that are essential to many lifestyles and backgrounds. For example, buying clothing online is particularly difficult because clothing fits are not standardized across brands. In other words, a small size in one brand might feel larger than a small size in another brand for a similar product. In these instances, an individual typically makes a large impact on their clothes shopping goals by physically trying on clothes before buying them. This applies to almost every product that needs to be held to determine its suitableness.

Therefore, there exists a need for an improved shopping system that uniquely blends select attributes from online and brick-and-mortar shopping.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Disclosed herein is a shopping method, comprising:

at a real-world browsing environment, facilitating interaction between a shopper and a brand experience; and tracking the receipt of one or more orders to automatically execute delivery of one or more orders.

In another aspect, automatically executing delivery includes delivering an order to the shopper's residence.

In another aspect, the method is a hybrid online shopping method including steps to provide a brand experience in both brick-and-mortar and e-commerce sectors.

In another aspect, the real-world browsing environment is easily customizable using modular components.

In another aspect, the real-world browsing environment includes small businesses offering products and/or services of high quality to a small number of customers.

In another aspect, the real-world browsing environment feels somewhat like a brick-and-mortar venue but provides access to e-commerce.

In another aspect, the brand experience includes displaying merchandise and barcodes, wherein the merchandise includes clothing and accessories and a barcode that can be automatically sized, scanned, and paid for using a device, wherein the device is at least one of a handheld device and a boutique in-house kiosk, and wherein merchandise is subsequently delivered to a location selected by a customer, and the location being somewhere other than the real-world browsing environment property.

In another aspect, executing delivery includes shipping using various available and appropriate methods.

In another aspect, the brand experience is sensory.

In another aspect, the shopping method reduces operational expenses compared to traditional brick-and-mortar establishments.

In another aspect, merchants of the real-world browsing environment are selected and flexibly showcased to seasonably rotate.

In another aspect, the shopping method provides balance sheet savings as a result of efficiencies enabled by a lack of requiring inventory at the real-world browsing environment.

In another aspect, the real-world browsing environment does not have stored merchandise of the brand experience.

In another aspect, the real-world browsing environment requires less salesclerks and labor in comparison to brick-and-mortar establishments to sell at least the same dollar volume of merchandise or in accordance with any appropriate comparable metric.

In another aspect, the merchandise returns are handled by a physical establishment other than the real-world browsing environment.

In another aspect, the merchandise is showcased and sold without requiring a retail middleman.

In another aspect, a sale occurs off-site at fulfillment centers.

In another aspect, a first floor of the real-world environment has a food court.

In another aspect, a second floor of the real-world environment has one or more merchant showcases.

In another aspect, a third floor of the real-world environment has high end restaurants.

In another aspect, the real-world browsing environment is managed by a jointly-owned and democratically controlled enterprise.

In another aspect, the real-world browsing environment resembles a bazaar.

In another aspect, the real-world browsing environment is managed by an entity having attributes of a bazaar and a co-op.

In another aspect, merchants behind the brand experience are on a contractually rotating schedule of a number of merchants on the order of 50 to 100 online-only merchant vendors physically showcasing their merchandise.

In another aspect, the shopping method fills a role in a real estate sector and/or business sector where holding inventory has significant drawbacks.

In another aspect, the shopping method is a hybrid mix of online and in-store shopping experiences.

In another aspect, the shopping method includes selecting a highly scrutinized basket of merchants.

In another aspect, the shopping method includes selecting merchants that require no more than a range of approximately 500-1000 square feet to showcase their merchandise.

In another aspect, the shopping method further comprises running an artificial intelligence program to at least one of find merchandise and complete a sale.

In another aspect, the shopping method further comprises a cloud computing subsystem.

In another aspect, the shopping method further comprises: receiving an order input at a user terminal, wherein the user terminal is physically near by the real-world browsing environment, and wherein the user input submits an order for delivery to a desired location indicated by a user.

In another aspect, the shopping method directly connects a factory to a consumer.

In another aspect, the shopping method provides a platform for local manufacturers to allow customers to try products, where inventory for the local manufacturers are located away from the real-world browsing environment.

In another aspect, the shopping method further comprises: specializing a product according to a customer preference.

In another aspect, the shopping method includes an electronic sizing submethod.

In another aspect, the shopping method includes limited try-on access for merchandise.

In another aspect, the real-world browsing environment includes at least one of a fine dining area, gourmet food court, and/or family restaurants.

In another aspect, the real-world browsing environment includes at least one of an outdoor courtyard, balcony seating for dining, and/or areas for social functions and gatherings.

In another aspect, the shopping method further includes at least one or more of cameras and sensors, wherein the one or more cameras and sensors are configured to at least one of track shoppers once they enter and while they shop in the real-world browsing environment, the one or more cameras and/or sensors being capable of tracking shoppers for at least several hours.

In another aspect, digital augmented or mixed reality content is used to assist a user in the shopping method.

In another aspect, the real-world browsing environment is located at least at one physical location a customer could visit.

In another aspect, a number of brand experiences at the real-world browsing environment is limited to a range on the order of 50-100 merchants.

In another aspect, executing delivery of one or more orders occurs within days.

In another aspect, the shopping method further comprises: using onsite OCR technologies for locating vendor merchandise off site electronically.

In another aspect, a number of brand experiences at the real-world browsing environment is limited to a range on the order of 500-600 merchants.

In another aspect, a brand experience could be selected for display on a rotating system cycling on a predetermined time period.

In another aspect, inventory for the brand experience is located substantially far from the real-world browsing environment, substantially far being defined as being reasonably far enough that an ordinary person would consider their physical operations to be relatively unrelated.

In another aspect, a point-of-sale of the system is configured to occur off-site electronically via a device, the device being at least one of a handheld electronic device and a computer equipped kiosk.

In another aspect, the shopping method combines elements of brick-and-mortar shopping and online shopping, the elements being at least one of social, sensory, and delivery convenience.

In another aspect, a merchant of the real-world browsing environment is an online vendor represented in a physical space via the brand experience.

In another aspect, the real-world browsing environment includes one more physical showcases of at least one of goods and services.

In another aspect, the real-world browsing environment includes one or more physical showcases of merchandise.

In another aspect, the real-world browsing environment includes one or more physical showcases of merchandise displayed in boutique fashion.

In another aspect, the real-world browsing environment includes one or more physical showcases of merchandise and accompanying one or more electronic catalogues.

In another aspect, the real-world browsing environment includes one or more physical showcases of merchandise displayed in a dedicated space on the range of at least 50-1000 square feet.

In another aspect, a mall includes 3 or more levels (or sometimes less than 3).

In another aspect, the levels include a food court, bazaar boutique, showrooms, and high-end restaurants and no on-site fulfillment center.

In another aspect, the mall are a re-do or a re-model which would allow for more tailored customization and flexibility than a mall without the disclosed innovation.

In another aspect, the invention are used or implemented with existing mall complexes.

In another aspect, new buildings are built for use with the disclosed innovations.

In another aspect, a mall of the disclosed system allows for same day pickup and take-home and also try-on.

In another aspect, home delivery is the only method of transferring the product to the user.

In another aspect, delivery is configured to take place via 24-72 hour delivery, or any delivery window such as 2-hour or even 1 hour.

In another aspect, an in-house fulfillment center accepts returns.

In another aspect, a fulfillment center is a warehouse.

In another aspect, the invention includes the absence of an on-site fulfillment center or warehouse In another aspect, an on-site fulfillment center is included in a space of an existing mall, along with, or even separate from, the brand experiences.

In another aspect, an on-site fulfillment center is created by converting a whole existing department store.

In another aspect, only part of the department store is converted to a fulfillment center.

In another aspect, the number of merchant brands in a "basket" of merchants located in the disclosed mall is 500-1000, including national and international on-line only and traditional brick and mortar brands, where some recently bankrupt brands due to the COVID-19 pandemic (or any reason for losing in-store shoppers) benefit.

In another aspect, the disclosed invention allows such brands to gain access to the ecommerce market while retaining their brand image by allowing customers to experience the brand's products in-person.

In another aspect, the square footage is flexible for each brand, and for example boutique showrooms in the mall are limited to 50, 100, 1000, 1500, or 2000 square feet approximately (approximately meaning there is a reasonable deviation from these values as known in the art of mall planning.)

In another aspect, a minimum square footage is 500 square feet but in other embodiments the minimum could be 2000 square feet.

In another aspect, the real-world browsing environment property is or includes a boutique showroom only or could be or include a mall property.

In another aspect, a sale occur on site while the user shops or while the user is away from the site.

In another aspect, sale is done via any appropriate device, such as a mobile device or a kiosk.

In another aspect, a user could visit e-commerce brands in the mall and experience their products, and they could either place the order at a kiosk of the mall or by using their mobile device at the mall or away from the mall.

In another aspect, a customized proprietary software, server, and cloud system is included to facilitate any or all of the processes, tasks, methods, features, or elements described herein through the figures and text.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
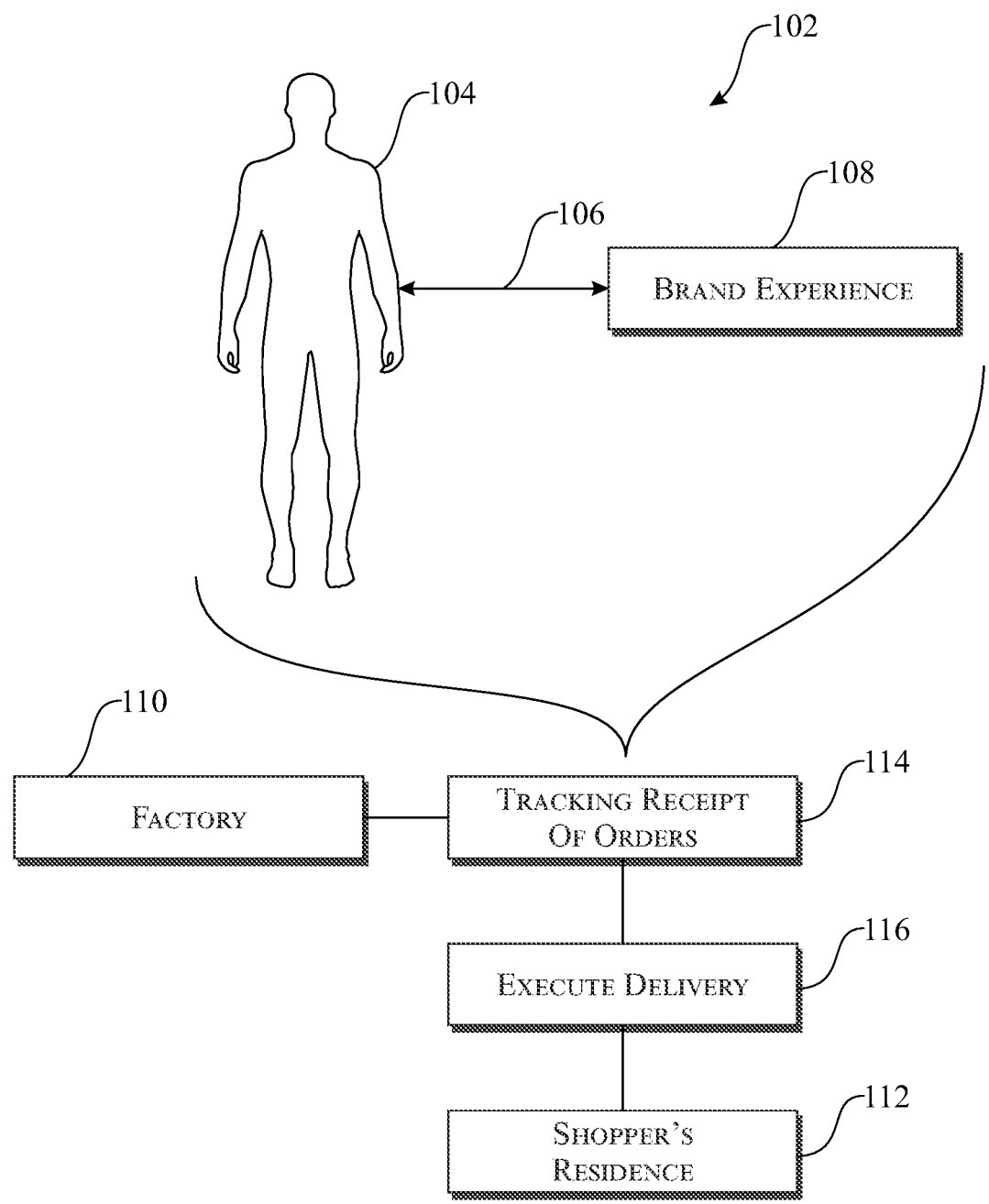
FIG. 1 schematically presents an overview of a shopping method disclosed herein, where shoppers are interacting with a brand experience in a real-world browsing environment, such that an order is placed by the shopper and sent to a factory or warehouse, and such that an order is subsequently delivered to the shopper's residence, in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As detailed herein, the present invention is directed toward a shopping method incorporating a hybrid mixed-use shopping business model. In particular, a shopping methodology that incorporates a hybrid mix of electronic commerce (e-commerce) with in-store brick-in-mortar retail areas. The specialized marketplace includes a predetermined set of e-commerce merchant vendors that physically showcase a variety of merchandise in a defined retail area together with their electronic product catalogues. Importantly, the hybrid mixed-use shopping business model employs no on-site inventory whatsoever and provides an advantageous improvement to practical applications that include e-commerce, shopping malls, and inventory control. The shopper visiting specialized marketplace will have access to a select set of products (e.g., clothes to try-on for size) but any order is communicated directly from the specialized marketplace for fulfillment by the merchant vendor's factory or distribution center for direct delivery to the shopper's home (or designated delivery address). This solves a business problem of inventory carrying costs and reduces the amount of labor needed (e.g., fewer salespersons) that translate to improved financial balance sheets for the merchant vendors. This also decreases the potential for in-store theft given the limited number of products that are physically present to the shopper. Another problem solved is the ability to customize a product for the shopper's/client's needs given the inventory reduction.

Shown throughout the figures is a shopping method, comprising, at a real-world browsing environment 102 (FIG. 1), facilitating interaction 106 between a shopper 104 and a brand experience 108, and tracking the receipt of one or more orders 114 to automatically execute delivery 116 of one or more orders. For example, one or more processors could track the receiving and sending of the orders and automatically execute tasks according to this tracking step. A processor or logic machine could determine a next step to take in the processes described herein by tracking information received through user input relating to the methods and processes described herein. For example, orders could be received through a graphical user interface (GUI) at a kiosk or mobile device. User selection could be inputted into the GUI to execute a task based on information currently available, such as data relating to an item a user is interested in.

Figure 2:
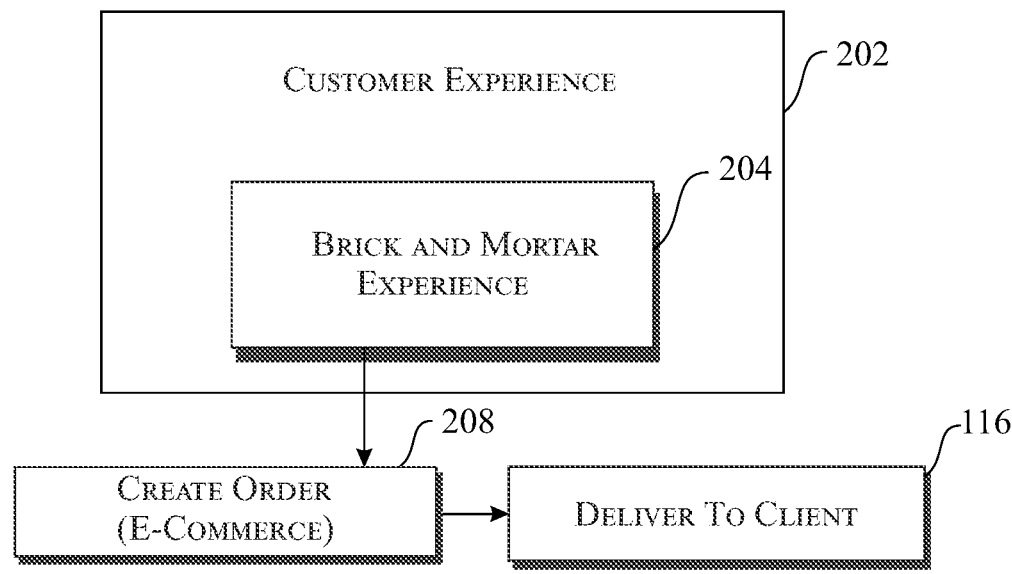
FIG. 2 schematically presents an example method of capturing a customer experience at a brick and mortar style showcase, subsequently creating an e-commerce order, and delivering an order to a client, in accordance with aspects of the present disclosure.

In some ways the method could be considered a hybrid online shopping method including steps to provide a customer experience 202 (FIG. 2) in both brick-and-mortar 204 and e-commerce 208 sectors. The method could be executed by any appropriate system of one or more devices and entities (e.g., user/admin).

Executing delivery 116 could include delivering an order to a shopper's residence 112 (FIG. 1). This could be done in any suitable way such as via land, air, or sea using any suitable manned or unmanned vehicles or plurality of vehicles.

The real-world browsing environment could be easily customizable using modular components. For example, since no inventory is required, management could easily rearrange the presence and presentation of brand experiences. Having modular foundations would assist in rotating through brand experiences allowing more flexibility in business operations, deals, and roles. As a non-limiting example, the herein disclosed real-world browsing environment could be considered more so similar to a venue than a traditional mall with brick-and-mortar shops heavied by store-front inventory physically present and managed The real-world browsing environment could include small businesses offering products and/or services of high quality to a small number of customers. This could be considered a boutique shopping environment. Given the agility of the disclosed methods and system, short term trends in unique real estate locations can be easily captured because no inventory is required on site. As a non-limiting example, boutique trends can be captured which would otherwise pass by because inventory risk is sometimes too high to move into a boutique space, especially only for the short term.

The real-world browsing environment could feel somewhat like a brick-and-mortar venue but while providing access to e-commerce. For example, a user could be encouraged to walk around a store to browse and touch items or even just to look at items more closely that are on display and at checkout experience what is expected of e-commerce.

Figure 3:
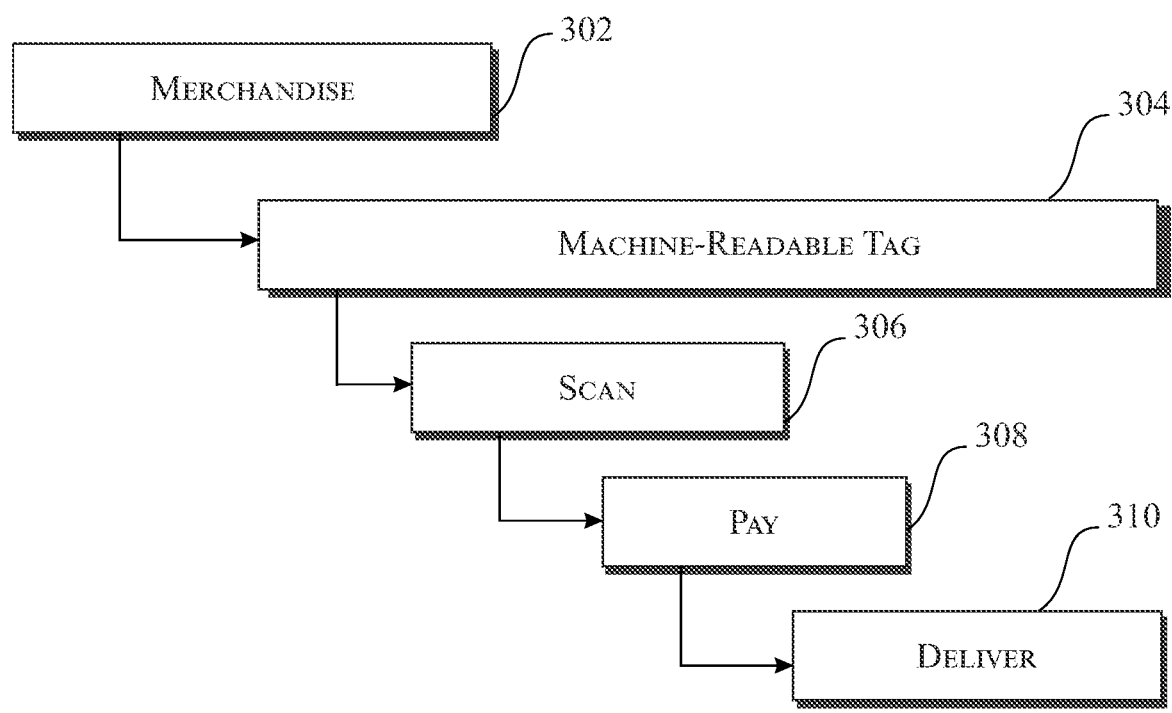
FIG. 3 schematically presents an example method where merchandise has a machine-readable tag, the tag being scannable to enter a payment and subsequently deliver the merchandise, in accordance with aspects of the present disclosure.

The brand experience could include displaying merchandise 302 (FIG. 3) and barcodes 304. The merchandise could include clothing and accessories and/or a barcode. It is anticipated that the barcode could be automatically sized, scanned 306, and paid for 308 using a device. The device could be at least one of a handheld device and/or a boutique in-house kiosk. Merchandise could be subsequently delivered 310 to a location selected by a customer. The location could be somewhere other than the location of the real-world browsing environment property. As a non-limiting example, the real-world browsing environment property could be downtown in a city while the factory is in a rural or suburban area.

Executing delivery could include shipping using various available and appropriate methods. This means standard mail or specialized mail would be suitable.

The brand experience could be sensory. This could include visual, audio, and touch stimuli, or even trying on clothes would be an example of a sensory experience. This sensory experience could be or could include a standard shopping experience expected from brick and mortar locations.

The shopping method reduces operational expenses compared to traditional brick-and-mortar establishments. For example, no inventory means less space and employees are required on-site. Furthermore, returns could be more efficiently handled by another location rather than a physical storefront. In other words, the merchandise returns could be handled by a physical establishment other than the real-world browsing environment.

As another non-limiting example, the shopping method could provide balance sheet savings as a result of efficiencies enabled by a lack of requiring inventory at the real-world browsing environment. The real-world browsing environment does not have stored merchandise of the brand experience. As another non-limiting example, the real-world browsing environment requires less salesclerks and labor in comparison to brick-and-mortar establishments to sell at least the same dollar volume of merchandise or in accordance with any appropriate comparable metric.

Merchants of the real-world browsing environment could be selected and flexibly showcased to seasonably rotate. Such seasonality could be done in any suitable way. The merchandise could be showcased and sold without requiring a retail middleman. In one non-limiting example, a sale occurs off-site at fulfillment centers.

Figure 4:
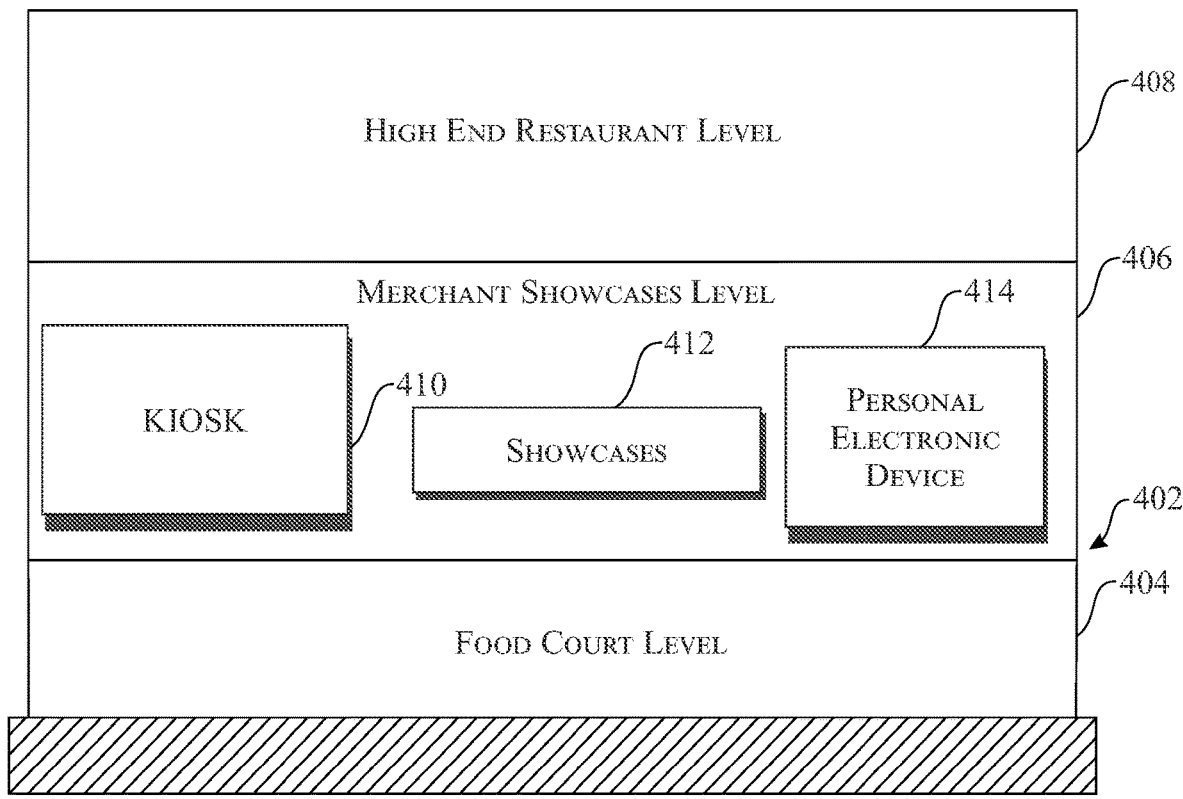
FIG. 4 schematically presents an exemplary elevation view of a high end restaurant level, a merchant showcase level, and a food court level, where a kiosk, showcases, and a personal electronic device is shown in the merchant showcase level, in accordance with aspects of the present disclosure.

In one non-limiting example, turning to FIG. 4, a first floor 404 of the real-world environment 402 has a food court, a second floor 406 of the real-world environment has one or more merchant showcases, and a third floor 408 of the real-world environment has high end restaurants. FIG. 4 also shows a personal electronic device 414 available to place orders, showcases 412, and a kiosk 410 which could also take orders.

The real-world browsing environment could be managed by a jointly-owned and democratically controlled enterprise. In one non-limiting example, the real-world browsing environment resembles a bazaar. The real-world browsing environment could be managed by an entity having attributes of a bazaar and a co-op. In one non-limiting example, merchants behind the brand experience are on a contractually rotating schedule of a number of merchants on the order of 50 to 100 online-only merchant vendors physically showcasing their merchandise.

In one non-limiting example, the shopping method fills a role in a real estate sector and/or business sector where holding inventory has significant drawbacks. The shopping method is a hybrid mix of online and in-store shopping experiences. The shopping method could include selecting a highly scrutinized basket of merchants.

The shopping method could include selecting merchants that require no more than a range of approximately 500-1000 square feet to showcase their merchandise. In one non-limiting example, the shopping method further comprises running an artificial intelligence program to at least one of find merchandise and complete a sale. The shopping method further comprises a cloud computing subsystem in some examples.

The shopping method could further comprise: receiving an order input at a user terminal. The user terminal could be physically nearby the real-world browsing environment. The user input could submit an order for delivery to a desired location indicated by a user. The shopping method directly connects a factory 110 (FIG. 1) to a consumer in some examples.

In one example, the shopping method provides a platform for local manufacturers to allow customers to try products, where inventory for the local manufacturers are located away from the real-world browsing environment.

The shopping method could further comprise: specializing a product according to a customer preference. In one non-limiting example, the shopping method could include an electronic sizing submethod. The shopping method could include limited try-on access for merchandise. The real-world browsing environment could include at least one of a fine dining area, gourmet food court, and/or family restaurants.

In one non-limiting example, the real-world browsing environment could include at least one of an outdoor courtyard, balcony seating for dining, and/or areas for social functions and gatherings.

The shopping method further could include at least one or more of cameras and sensors. The one or more cameras and sensors could be configured to at least one of track shoppers once they enter and while they shop in the real-world browsing environment. The one or more cameras and/or sensors could be capable of tracking shoppers for at least several hours.

In one non-limiting example, digital augmented or mixed reality content is used to assist a user in the shopping method. In one non-limiting example, the real-world browsing environment is located at least at one physical location a customer could visit. In one non-limiting example, a number of brand experiences at the real-world browsing environment is limited to a range on the order of 50-100 merchants.

In one non-limiting example, executing delivery of one or more orders occurs within days. In one non-limiting example, the shopping method further comprises: using onsite OCR technologies for locating vendor merchandise off site electronically. A number of brand experiences at the real-world browsing environment could be limited to a range on the order of 500-600 merchants.

A brand experience could be selected for display on a rotating system cycling on a predetermined time period. In one non-limiting example, inventory for the brand experience is located substantially far from the real-world browsing environment, substantially far being defined as being reasonably far enough that an ordinary person would consider their physical operations to be unrelated. A point-of-sale of the system could be configured to occur off-site electronically via a device, the device being at least one of a handheld electronic device and a computer equipped kiosk.

The shopping method could combine elements of brick-and-mortar shopping and online shopping, the elements being at least one of social, sensory, and delivery convenience. In one non-limiting example, a merchant of the real-world browsing environment is an online vendor represented in a physical space via the brand experience. In one non-limiting example, the real-world browsing environment could include one more physical showcases of at least one of goods and services.

Figure 5:
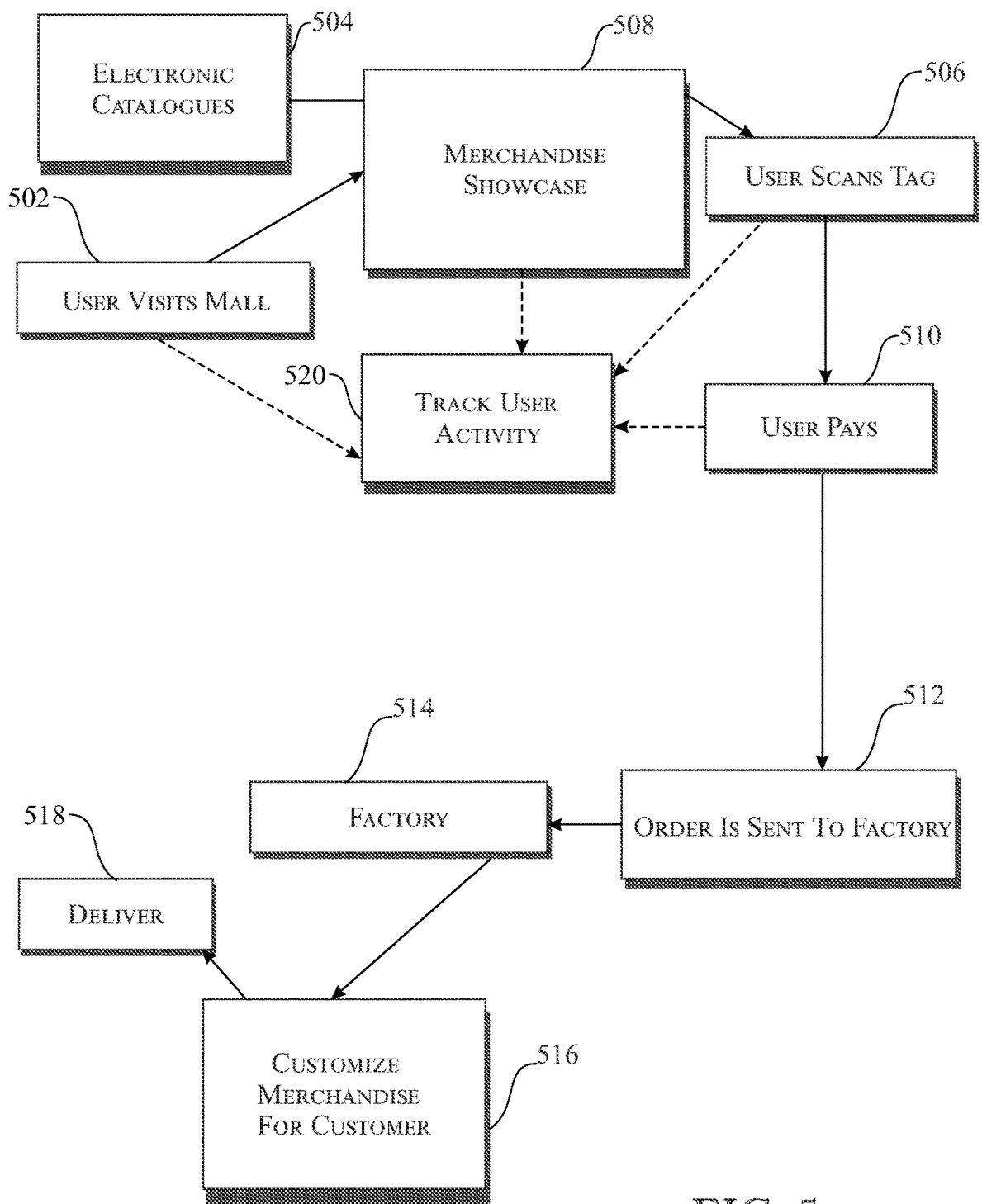
FIG. 5 schematically presents an exemplary flow chart starting from the point where a user visits a mall to delivering an order to the user, in accordance with aspects of the present disclosure.

The real-world browsing environment could include one or more physical showcases of merchandise that a user would want to visit at a mall 502 (FIG. 5). The real-world browsing environment could include one or more physical showcases of merchandise displayed in boutique fashion. The real-world browsing environment could include one or more physical showcases of merchandise 508 and accompanying one or more electronic catalogues 504 (FIG. 5). The real-world browsing environment could include one or more physical showcases of merchandise displayed in a dedicated space on the range of at least 50-1000 square feet. Illustratively, at 506 a user scans a tag from the physical showcases of merchandise 508, at 510 a user pays, at 512 an order is sent to a factory, at 514 a factory receives the order and at 516 merchandise is customized or produced for the customer, and at 518 the order is delivered. At 520 (which could be continuous through the process) user activity is tracked by sensors and/or cameras.

Figure 6:
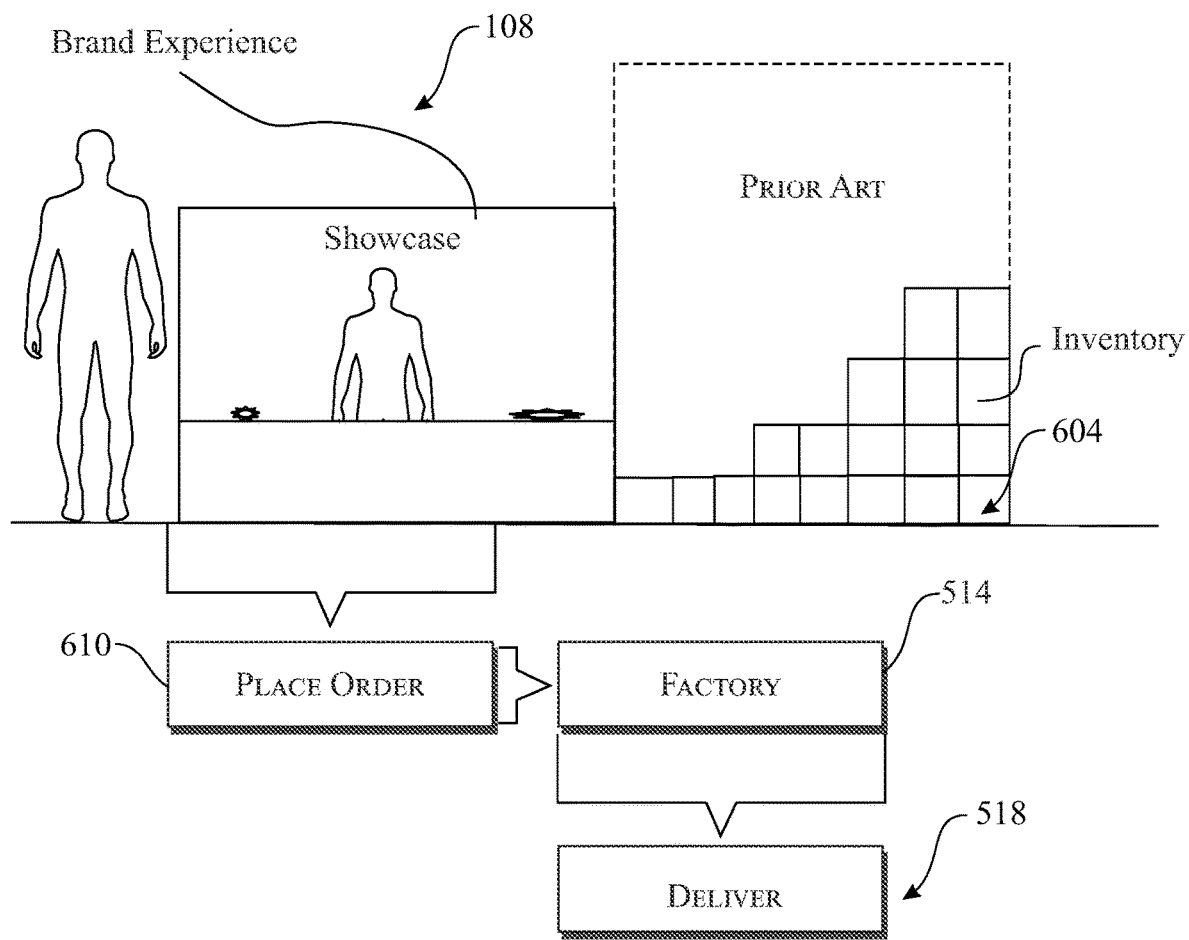
FIG. 6 schematically presents a prior art inventory on the right hand side in dashed line and a showcase of the present disclosure on the left hand side to illustrate how an order is generated without inventory and subsequently delivered to a customer, in accordance with aspects of the present disclosure.

As shown in FIG. 6 a prior art situation is shown in dashed line on the right where inventory 604 is weighing down an establishment trying to showcase and sell merchandise. Using the disclosed method instead of requiring the dashed line prior art inventory the user simply experiences the product at 108 and places an order at 610. The order is sent to factory 514 which produces and/or delivers the merchandise to the user at 518.

Figure 7:
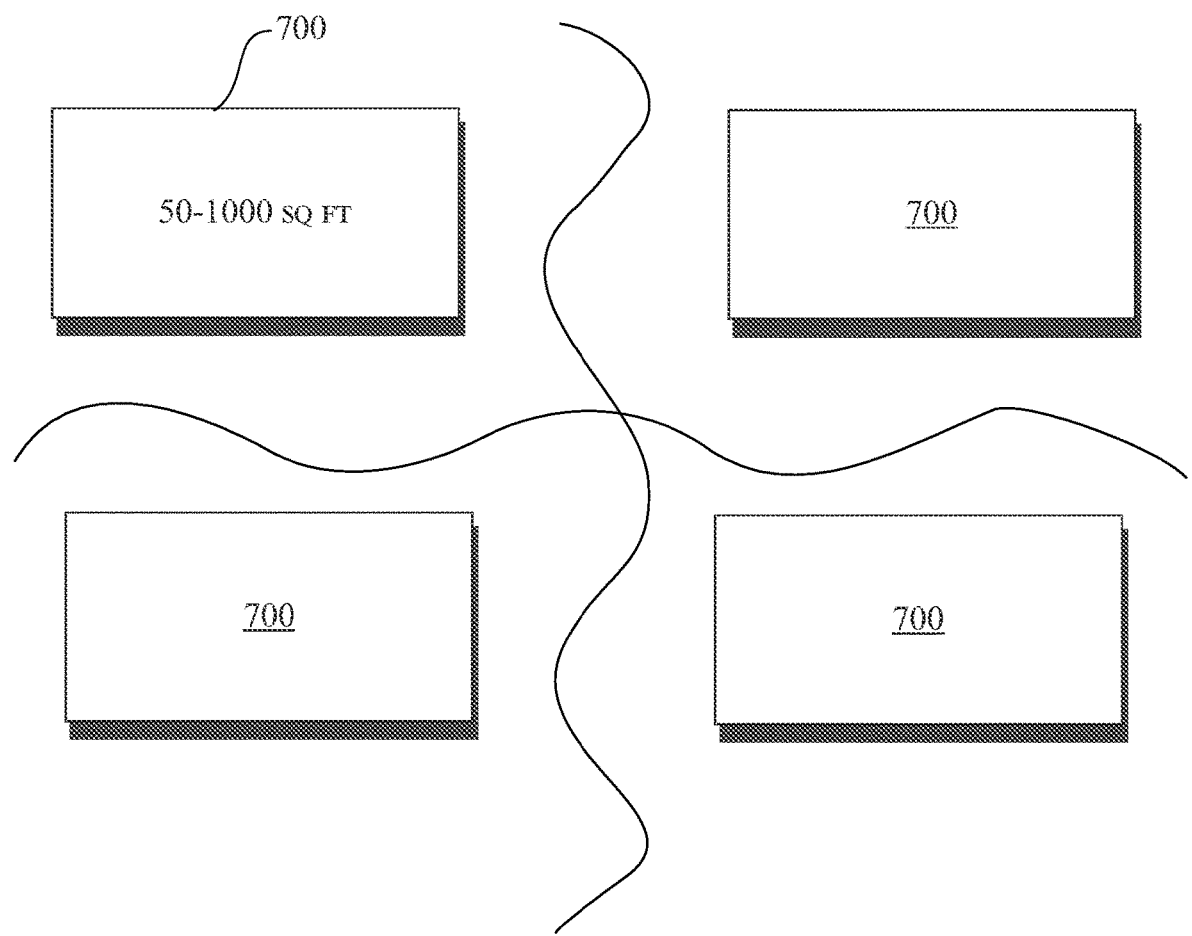
FIG. 7 schematically presents a top down view of 50-1000 square feet units for staging a showcase and walking space between the units, in accordance with aspects of the present disclosure.

The illustration of FIG. 7 shows an example top-down view where four store experiences are shown at 700 indicated as having an area of 50-1000 square feet each. Between the stores foot traffic is fluid as shown by curved lines.

A mall as disclosed herein could include 3 or more levels, as a non-limiting example. The levels could include a food court, bazaar boutique, showrooms, and high-end restaurants and no on-site fulfillment center. In one example embodiment, the mall could be a re-do or a remodel which would allow for more tailored customization and flexibility. This would allow the invention to be used with existing mall complexes. But it is to be understood that this is merely included as an example, and new buildings could be built for use with the disclosed innovations.

Existing malls vary in design and size but have ample space for on-site in-house fulfillment centers which could allow for some same day pickup and take-home and also try-on. Alternatively, the home delivery could be the only method of transferring the product to the user in some embodiments, which could take place via 24-72 hour delivery. An in-house fulfillment center could accept returns in some embodiments. Such fulfillment centers could be busy places, similar to a warehouse setting. This is to show that the invention is not limited to the absence of an on-site fulfillment center or warehouse, and such features could be included because existing malls may have space for such features. However, such on-site fulfillment centers are not similar to those present in existing malls. Such on-site fulfillment centers are unique because they could be created by converting a whole existing department store such as JC PENNEY or SEARS (e.g., this would be a space conversion). Therefore, the method may include, converting an existing department store into a fulfillment center. In another example, only part of the department store is converted to a fulfillment center.

The number of merchant brands in a "basket" of merchants located in the disclosed mall could be 500-1000, including national and international on-line only and traditional brick and mortar brands, where some recently bankrupt brands due to the COVID-19 pandemic (or any reason for losing in-store shoppers) could especially benefit. E-commerce and traditional brick-and-mortar have been struggling with one another to obtain or keep market share since the inception of e-commerce but recently due to the COVID-19 pandemic many traditional brick and mortar brands are going bankrupt. The disclosed invention allows such brands to gain access to the ecommerce market while retaining their brand image by allowing customers to experience the brand's products in-person.

The square footage could be flexible for each brand, and for example boutique showrooms in the mall could be limited to 50, 100, 1000, 1500, or 2000 square feet approximately (approximately meaning there is a reasonable deviation from these values as known in the art of mall planning.) In some embodiments a minimum square footage is 500 square feet but in other embodiments the minimum could be 2000 square feet. It is to be understood that any suggested values herein is not to limit the spirit or scope of the disclosure. Appropriately selected square footage could be dependent on mall square footage and the square footage needs of a merchant brand vendor. The brands could be USA brands or ex-USA international or global brands.

It is to be understood that the real-world browsing environment property could be or include a boutique showroom only or could be or include a mall property. Any appropriate combination of buildings or existing buildings could be used.

It is to be understood that the sale could occur on site while the user shops or while the user is away from the site. The sale could be done via any appropriate device, such as a mobile device or a kiosk. For example, a user could visit some e-commerce brands in the mall and experience their products, and they could either place the order at a kiosk of the mall or using their mobile device at the mall or away from the mall.

It is to be understood that a customized proprietary software, server, and cloud system to be included to facilitate any or all of the processes, tasks, methods, features, or elements described herein through the figures and text.

Figure 8:
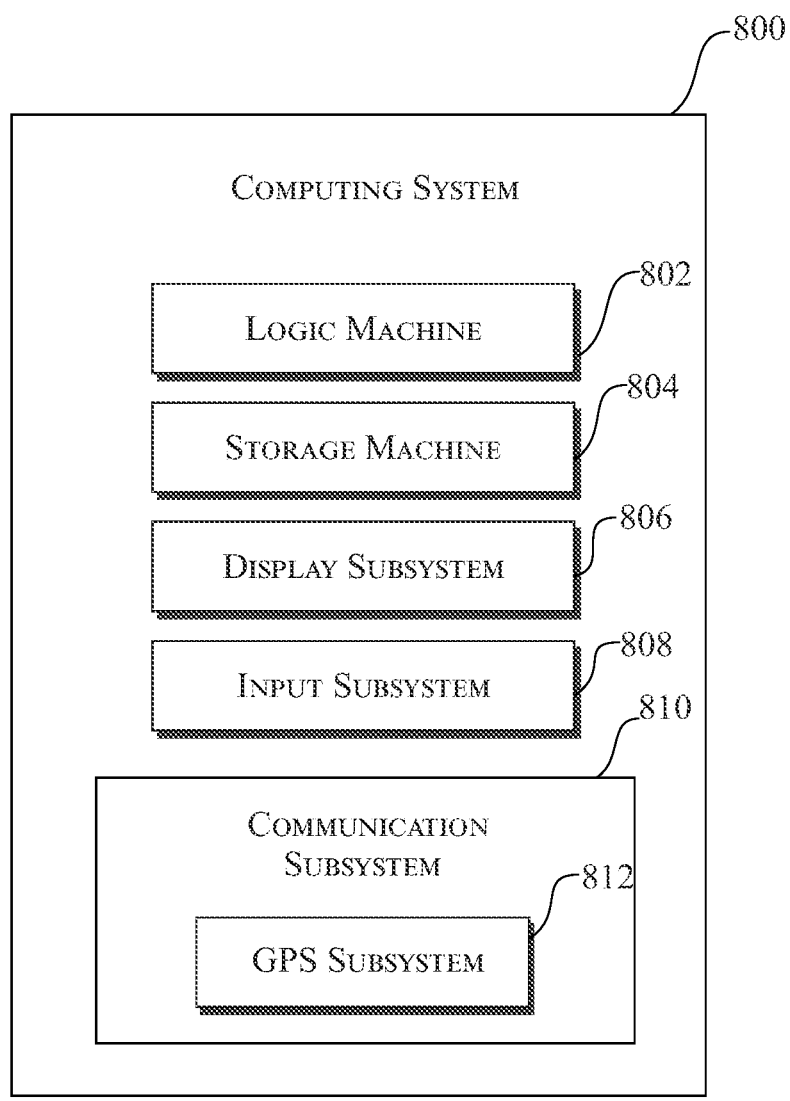
FIG. 8 schematically presents an exemplary computing system to assist in executing the suitable tasks described herein, in accordance with aspects of the present disclosure.

In some embodiments the methods, tasks, processes, and/or operations described herein may be automatically effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or enact the above described methods, processes, operations, and/or tasks. For example, a suitable computing system may be computing system 800 shown in FIG. 8. When such methods, operations, and/or processes are implemented, the state of the storage machine 804 may be changed to hold different data. For example, the storage machine 804 may include memory devices such as various hard disk drives, CD, or DVD devices. The logic machine 802 may execute machine-readable instructions via one or more physical information and/or logic processing devices. For example, the logic machine 802 may be configured to execute instructions to perform tasks for a computer program. The logic machine 802 may include one or more processors to execute the machine-readable instructions. The computing system 800 may include a display subsystem 806 to display a graphical user interface (GUI) or any visual element of the methods or processes described above. For example, the display subsystem 806, storage machine 804, and logic machine 802 may be integrated such that the above method may be executed while visual elements of the disclosed system and/or method are displayed on a display screen for user consumption. The computing system 800 may include an input subsystem 808 that receives user input. The input subsystem 808 may be configured to connect to and receive input from devices such as a mouse, keyboard, or gaming controller. For example, a user input may indicate a request that a certain task is to be executed by the computing system 800, such as requesting the computing system 800 to display any of the above described information or requesting that the user input updates or modifies existing stored information for processing. A communication subsystem 810 may allow the methods described above to be executed or provided over a computer network. The computing system 800 may include a global positioning system (GPS) module 812 that includes one or more GPS receivers for determining a location of one or more electronic devices (e.g., a smart phone). For example, the communication subsystem 810 may be configured to enable the computing system 800 to communicate with a plurality of personal computing devices. The communication subsystem 810 may include wired and/or wireless communication devices to facilitate networked communication. The described methods or processes may be executed, provided, or implemented for a user or one or more computing devices via a computer-program product such as via an application programming interface (API).

As a non-limiting example, the disclosure teaches action by a processor to execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented. Therefore, the disclosed technical solutions eliminate or alleviate these problems and positively contribute to the technical abilities of existing computing systems and methods.

As a non-limiting example of such a practical application, embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (for example using an Internet Service Provider), or the connection may be made to external computers. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to schematic flowchart illustrations and/or block diagrams of methods, apparatus (systems), functions, and computer program products according to embodiments of the invention. It will be understood that each block of the flowchart illustrations and/or block diagrams, and combinations of blocks in the flowchart illustrations and/or block diagrams or functions, can be implemented by computer readable program instructions. Functions, including policy functions, are groups of computer readable program instructions grouped together that can be invoked to complete one or more tasks.

These computer readable program instructions may be provided to one or more processors of one or more general purpose computers, special purpose computer, or other programmable data processing apparatus to produce a machine, such that the instructions, which execute via the processors of the one or more computers or other programmable data processing apparatus, create means for implementing the functions/acts specified in the flowchart and/or block diagram block or blocks. These computer readable program instructions may also be stored in one or more computer readable storage mediums that can direct one or more computers, programmable data processing apparatuses, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the one or more computers, other programmable apparatuses or other device to produce a computer implemented process, such that the instructions which execute on the computers, other programmable apparatus, or other devices implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for implementing a hybrid mixed-use shopping model comprising:
    a physical department store location;
    a hybrid mixed-use business marketplace configured within the physical department store location, the hybrid mixed-use business marketplace further comprising:
        one or more physical showcases in combination with accompanying one or more electronic catalogues, wherein the one or more physical showcases are restricted to display-only use;
        wherein the hybrid mixed-use business marketplace facilitates interaction between a shopper and a brand experience in a real-world browsing environment such that a predetermined set of merchants may physically showcase a variety of their merchandise using the one or more physical showcases together with the one or more electronic catalogues;
        wherein the predetermined set of merchants behind the brand experience are on a contractually rotating schedule;
    a fulfillment center for storing all merchandise inventory such that the merchandise inventory stored is physically located separate and away from the real-world browsing environment, and wherein the fulfillment center was created by converting a portion of space of the physical department store location;
    a device configured for receiving one or more merchandise orders for at least one merchandise item of the variety of merchandise items from the shopper and tracking the receipt of the one or more merchandise orders; and
    wherein delivery of the at least one merchandise item of the variety of merchandise items associated with the one or more orders received is executed automatically through the fulfillment center.

2. The system of claim 1, wherein the portion of space of the physical department store location comprises substantially all of the physical department store location.

3. The system of claim 1, wherein the variety of merchandise items are displayed in a boutique fashion using a boutique showroom having a square footage limited to 50, 100, 1000, 1500, or 2000 square feet in combination with a plurality of barcodes, each particular one barcode of the plurality of barcodes being specific to a particular merchandise item of the variety of merchandise items.

4. The system of claim 3, wherein the system further comprises:
    a handheld device associated with the shopper for ordering and paying for the at least one of the variety of merchandise items as a function of the particular one barcode specific thereto.

5. The system of claim 1, wherein at least one merchant of the predetermined set of merchants is an online vendor represented in a physical space via the brand experience.

6. The system of claim 1, wherein the predetermined set of merchants behind the brand experience on the contractually rotating schedule comprise a number of online-only merchants physically showcasing their merchandise of at least 50, but no more than 100, online-only merchants.

7. The system of claim 1, wherein the brand experience is one of a sensory, visual, audio and touch stimuli experience.

8. The system of claim 1, wherein the real-world browsing environment resembles a bazaar.

9. The system of claim 1, wherein the device is a kiosk.

10. The system of claim 1, wherein the physical department store location comprises at least three (3) levels and the one or more physical showcases are located on a particular one level of the at least three levels.

11. The system of claim 1, wherein the physical department store location is owned by a bankrupt entity.

12. The system of claim 1, wherein the real-world browsing environment comprises a plurality of modular components for customizing the real-world browsing environment.

13. The system of claim 1, wherein the variety of merchandise items comprise at least one clothing item and the brand experience is a sensory experience comprising a trying on of the at least one clothing item by the shopper.

14. The system of claim 13, wherein the trying on of the at least one clothing item by the shopper occurs at the fulfillment center.

15. The system of claim 1, wherein the system further comprises:
    one or more cameras and sensors configured for tracking the shopper upon entering the real-world browsing environment and while the shopper shops therein.

16. A system for implementing a hybrid mixed-use shopping model comprising:
    a physical department store location;
    a hybrid mixed-use business marketplace configured within the physical department store location, the hybrid mixed-use business marketplace further comprising:
        one or more physical showcases in combination with accompanying one or more electronic catalogues, wherein the one or more physical showcases are restricted to display-only use;
        wherein the hybrid mixed-use business marketplace facilitates interaction between a shopper and a brand experience in a real-world browsing environment such that a predetermined set of merchants may physically showcase a variety of their merchandise using the one or more physical showcases together with the one or more electronic catalogues;
        wherein the real-world browsing environment further comprises a plurality of modular components for customizing the real-world browsing environment;
        wherein the brand experience is one of a sensory, visual, audio and touch stimuli experience;
        wherein the predetermined set of merchants behind the brand experience are on a contractually rotating schedule; and
    a fulfillment center for storing all merchandise inventory such that the merchandise inventory stored is physically located separate and away from the real-world browsing environment, and wherein the fulfillment center was created by converting a portion of space of the physical department store location;

a device configured for receiving one or more merchandise orders for at least one merchandise item of the variety of merchandise items from the shopper and tracking the receipt of the one or more merchandise orders;

wherein delivery of the at least one merchandise item of the variety of merchandise items associated with the one or more orders received is executed automatically through the fulfillment center.

17. The system of claim 16, wherein the at least one merchandise item of the variety of merchandise items associated with the one or more orders received is delivered to a location selected by the shopper, wherein the location selected is somewhere other than the real-world browsing environment.

18. The system of claim 16, wherein the physical department store location comprises at least three (3) levels and the one or more physical showcases are located on a particular one level of the at least three levels.

19. The system of claim 16, wherein the physical department store location is owned by a bankrupt entity.

20. A system for implementing a hybrid mixed-use shopping model comprising:
   a physical department store location, wherein the physical department store location is owned by a bankrupt entity;
   a hybrid mixed-use business marketplace configured within the physical department store location, the hybrid mixed-use business marketplace further comprising:
      one or more physical showcases in combination with accompanying one or more electronic catalogues, wherein the one or more physical showcases are restricted to display-only use;
      wherein the hybrid mixed-use business marketplace facilitates interaction between a shopper and a brand experience in a real-world browsing environment such that a predetermined set of merchants may physically showcase a variety of their merchandise using the one or more physical showcases together with the one or more electronic catalogues;
      wherein at least one merchant of the predetermined set of merchants is an online vendor represented in a physical space via the brand experience;
      wherein the real-world browsing environment further comprises a plurality of modular components for customizing the real-world browsing environment;
      wherein the brand experience is one of a sensory, visual, audio and touch stimuli experience;
      wherein the predetermined set of merchants behind the brand experience are on a contractually rotating schedule; and
   one or more cameras and sensors configured for tracking the shopper upon entering the real-world browsing environment and while the shopper shops therein;
   a fulfillment center for storing all merchandise inventory such that the merchandise inventory stored is physically located separate and away from the real-world browsing environment, and wherein the fulfillment center was created by converting a portion of space of the physical department store location, wherein the variety of merchandise items comprise at least one clothing item and the brand experience comprises a trying on of the at least one clothing item by the shopper in the fulfillment center;
   a device configured for receiving one or more merchandise orders for at least one merchandise item of the variety of merchandise items from the shopper and tracking the receipt of the one or more merchandise orders; and
   wherein delivery of the at least one merchandise item of the variety of merchandise items associated with the one or more orders received is executed automatically through the fulfillment center.

* * * * *